US008577347B2

(12) United States Patent
Sperling et al.

(10) Patent No.: US 8,577,347 B2
(45) Date of Patent: Nov. 5, 2013

(54) SYSTEM AND METHOD FOR MANAGING DATA SHARING OVER A HOTSPOT NETWORK

(75) Inventors: David Sperling, Laguna Niguel, CA (US); Kevin Warmerdam, Encinitas, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 0 days.

(21) Appl. No.: 13/248,432

(22) Filed: Sep. 29, 2011

(65) Prior Publication Data

US 2012/0083256 A1 Apr. 5, 2012

Related U.S. Application Data

(60) Provisional application No. 61/389,169, filed on Oct. 1, 2010.

(51) Int. Cl.
*H04W 4/02* (2009.01)
(52) U.S. Cl.
USPC .......................... 455/414.2; 370/260; 370/338
(58) Field of Classification Search
USPC ................. 455/414.1–414.4, 422.1, 461.463, 455/550.1, 552.1–556.2; 370/259–266, 370/270, 271, 338; 709/204–207, 217–219
See application file for complete search history.

(56) References Cited

U.S. PATENT DOCUMENTS

| 2003/0189928 | A1* | 10/2003 | Xiong ........................... 370/389 |
| 2004/0053599 | A1 | 3/2004 | Karaoguz |
| 2006/0182045 | A1* | 8/2006 | Anderson ..................... 370/260 |
| 2008/0120369 | A1* | 5/2008 | Gustavsson ................... 709/204 |
| 2008/0177860 | A1* | 7/2008 | Khedouri et al. ............. 709/217 |
| 2010/0191576 | A1 | 7/2010 | Raleigh |

FOREIGN PATENT DOCUMENTS

| WO | WO 01/89155 | 11/2001 |
| WO | WO 2005/034407 | 4/2005 |
| WO | WO 2005/048011 | 5/2005 |
| WO | WO 2005/076884 | 8/2005 |
| WO | WO 2005/098674 | 10/2005 |
| WO | WO 2010/046263 | 4/2010 |
| WO | WO 2010/088075 | 8/2010 |

* cited by examiner

*Primary Examiner* — Kashif Siddiqui
(74) *Attorney, Agent, or Firm* — Farjami & Farjami LLP

(57) ABSTRACT

There is presented a system and method for managing data sharing over a hotspot network. The system comprises a mobile broadband hotspot with a processor configured to receive a selection of a mobile device to receive a data file, notify the mobile device of the data file to share, and transmit the data file to the mobile device in response to receiving a download request from the mobile device. By saving the data file into the memory of the mobile broadband hotspot, the mobile broadband hotspot may be directed to share the data file with other devices connected to the mobile broadband hotspot through a hotspot network without requiring the other devices to download the data file again through a wide area network.

20 Claims, 4 Drawing Sheets

SYSTEM AND METHOD FOR MANAGING DATA SHARING OVER A HOTSPOT NETWORK

RELATED APPLICATIONS

This application claims priority of U.S. Provisional Application No. 61/389,169 filed on Oct. 1, 2010, which is hereby incorporated by reference in its entirety.

BACKGROUND OF THE INVENTION

1. Field of the Invention

The present invention relates generally to a hotspot network. More particularly, the present invention relates to managing data sharing over a hotspot network.

2. Background Art

The use of mobile broadband hotspots has further increased the ubiquity and convenience of wireless broadband access. Data transferring speeds to the mobile broadband hotspots are constantly improving and is presently conforming to the fourth-generation wireless telephone technology (4G) standard. A mobile broadband hotspot may allow a plurality of devices to connect to the mobile broadband hotspot through Wi-Fi signals, Bluetooth signals, or other types of local area connection signals. As a result, many mobile devices can share an Internet access by simply connecting to a nearby mobile broadband hotspot. Since wireless mobile devices such as smartphones, for example, may be used as mobile broadband hotspots, hotspot availability may further expand in the future.

However, when many devices are downloading large files through a mobile broadband hotspot, the aggregate downloading may negatively affect the available bandwidth for each device. For example, there may be four devices connected to a mobile broadband hotspot and each device may attempt to download the same large video file. Consequently, the same video file may be downloaded through a single mobile broadband hotspot four separate times. Such unnecessary duplicate downloading of a large video file or any other file may result in bandwidth congestion, thereby reducing the quality of service for all devices.

Furthermore, the mobile broadband subscriber may also be negatively affected from such duplicate device download activity. Service providers typically enforce relatively modest data transfer quotas for mobile broadband data plans per billing cycle, such as two gigabytes per month, for example. These data transfer quotas may be easily exceeded when bandwidth intensive services such as online video services are accessed, particularly with multiple devices. Exceeding the data transfer quota may result in degraded or zero connectivity for the mobile broadband hotspot, and may also incur costly overage charges for the data plan subscriber.

Accordingly, there is a need to overcome the drawbacks and deficiencies in the art by presenting a solution for managing data sharing over a hotspot network so that a plurality of mobile devices may acquire a data file without duplicate downloading from a mobile broadband connection having a limited data transfer quota.

SUMMARY OF THE INVENTION

There is provided systems and methods for managing data sharing over a hotspot network, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for managing data sharing over a hotspot network. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
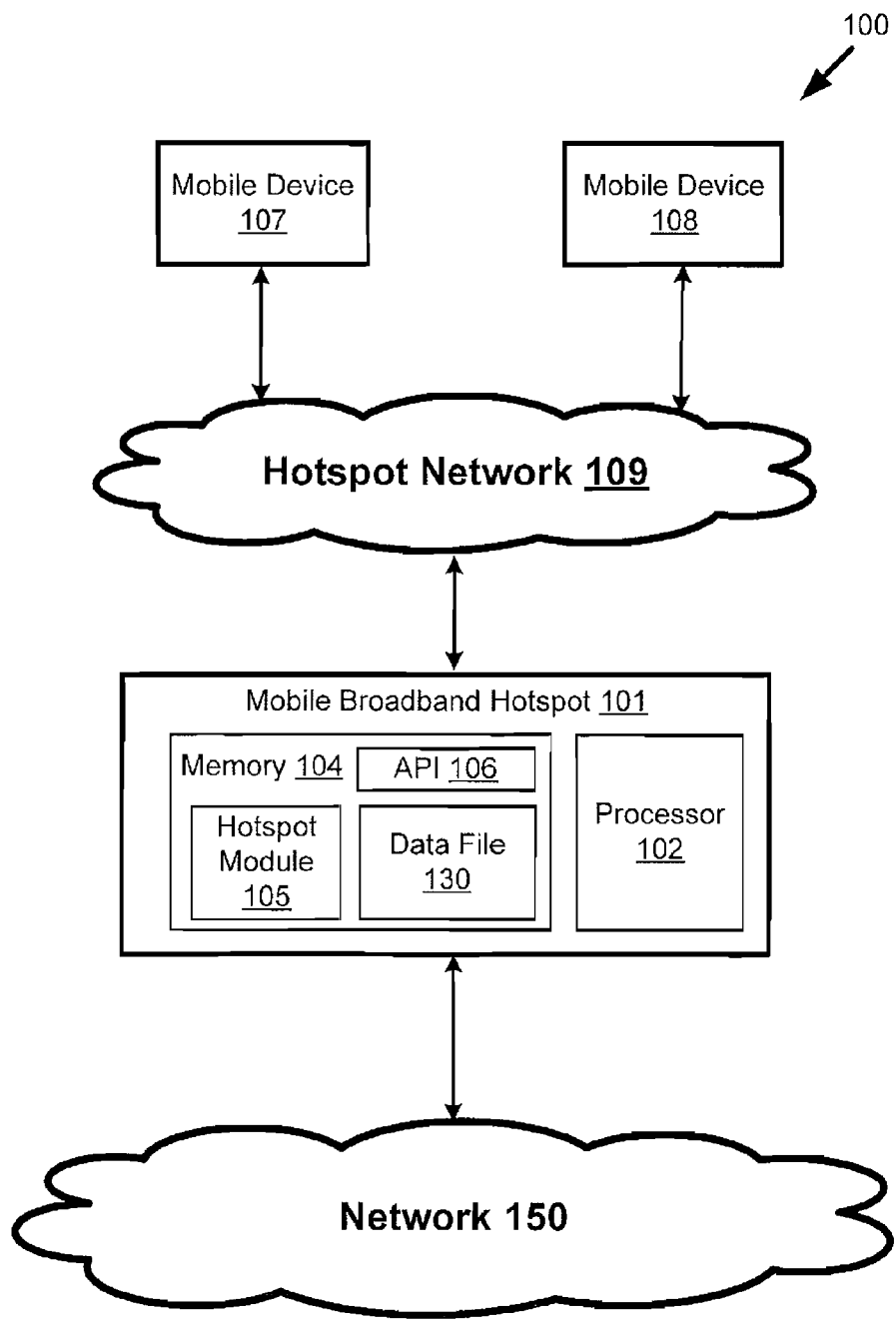
FIG. 1 presents a diagram in which a mobile broadband hotspot may manage data sharing over a hotspot network, according to one embodiment of the present invention.

FIG. 1 presents a diagram in which a mobile broadband hotspot may manage data sharing over a hotspot network, according to one embodiment of the present invention. Diagram 100 of FIG. 1 includes mobile broadband hotspot 101, hotspot network 109, mobile devices 107 and 108, and network 150. Mobile broadband hotspot 101 comprises memory 104 and processor 102. Memory 104 comprises application programming interface (API) 106, hotspot module 105, and data file 130.

Mobile broadband hotspot 101 may comprise any type of hotspot device, such as a dedicated hotspot device or as a smartphone, for example. Mobile devices 107 and 108 may comprise any type of mobile devices, such as smartphones, tablets, or laptops, for example. In the present embodiment, mobile broadband hotpot 101 may emit a wireless signal, such as, for example, a Wi-Fi signal or a Bluetooth signal, into the physical surrounding. Hotspot network 109 may comprise a plurality of devices connected to mobile broadband hotspot 101 through the wireless signal emitted from mobile broadband hotspot 101. Mobile devices 107 and 108 may be included in hotspot network 109. Thus, mobile devices 107 and 108 may access hotspot network 109 through mobile broadband hotspot 101 to access a mobile broadband uplink to network 150, which may comprise a wide area network such as the Internet. Memory 104 may comprise any type of machine-readable volatile or non-volatile storage medium. Processor 102 may comprise any type of processing unit, such as a central processing unit (CPU), for example. Hotspot module 105 may comprise an application containing one or more sequences of instructions which, when executed by processor 102, may control the actions of mobile broadband hotspot 101, such as receiving a request from mobile device 107 to transfer data file 130 to mobile device 108.

Hotspot module 105 may be implemented in accordance with API 106. API 106 may comprise an application programming interface data allowing mobile devices 107 and 108 and other devices in hotspot network 109 to communicate with hotspot module 105. In one embodiment, mobile devices 107 and 108 may receive device modules conforming to API 106 or to another API similar to API 106 from mobile broadband hotspot 101 upon connecting to mobile broadband hotspot 101. The device modules may comprise applications with one or more instructions that, when executed, may allow mobile devices 107 and 108 to receive data from and transmit data to mobile broadband hotspot 101 and to present popup notifications from mobile broadband hotspot 101. In alternative embodiments, mobile broadband hotspot 101 may communicate with mobile devices 107 and 108 through a web browser without installing device modules on mobile devices 107 and 108.

In one embodiment, mobile device 107 may download data file 130 from network 150, for example, from a video sharing service, and mobile broadband hotspot 101 may cache or store data file 130 into memory 104, as shown in FIG. 1. In alternative embodiments, mobile broadband hotspot 101 may automatically monitor and cache or store any type of data files, including large data files, downloaded by the mobile device 107. In order to avoid overwhelming memory 104, the types and sizes of data files to monitor and to cache may be set within mobile broadband hotspot 101. Data file 130 in mobile broadband hotspot 101 may be securely stored within memory 104, for example by password protection, encryption, and/or other security mechanisms. In one embodiment, only the device that downloaded data file 130 may have access to data file 130 on mobile broadband hotspot 101. In alternative embodiments mobile broadband hotspot 101 may store portions of the complete data file 130, such as storing only the last hour of a High Definition (HD) video, for example. In alternative embodiments mobile broadband hotspot 101 may delete downloaded data file 130 from memory 104 after a set amount of time. In other embodiments, mobile broadband hotspot 101 may share data file 130 with mobile device 108 through hotspot network 109, thereby allowing mobile device 108 to receive a copy of data file 130 while avoiding a duplicate download of data file 130 from network 150.

In order to share data file 130 with mobile device 108, processor 102, executing hotspot module 105, may be configured to receive a selection of mobile device 108 to receive data file 130. The receiving may further comprise receiving the selection of mobile device 108 from another mobile device 107. For example, while mobile broadband hotspot 101 is in file sharing mode, a user of mobile device 107 may select mobile device 108 to receive data file 130 through the input device of mobile device 107. The display of mobile device 107 may constitute an input screen and mobile device 108 may be selected from the display, thereby constitution a selection of mobile device 108. Prior to receiving a selection of mobile device 108, processor 102, executing mobile hotspot 105, may be configured to activate a file sharing mode of mobile broadband hotspot 101. File sharing mode may be activated to ensure that mobile broadband hotspot 101 contains the data to share and is ready to share the data with another device connected to mobile broadband hotspot 101.

In FIG. 1, mobile broadband hotspot 101 containing data file 130 may already be in file sharing mode. However, in alternative embodiments, the activating of the file sharing mode may comprise uploading data file 130 into a landing page of mobile broadband hotspot 101. For example, mobile device 107 may have received data file 130 without using mobile broadband hotspot 101. Thus, mobile broadband hotspot 101 may not initially possess data file 130 in memory 104. In order to share data file 130, mobile broadband hotspot 101 may be required to activate the file sharing mode of mobile broadband hotspot 101 by uploading data file 130 into a landing page of mobile broadband hotspot 101. By uploading data file 130 into the landing page, data file 130 may be transmitted to memory 104 of mobile broadband hotspot 101. The landing page may, for example, be accessed through a web browser on a display of mobile device 107.

In the present embodiment, processor 102, executing hotspot module 105, may be configured to notify mobile device 108 of data file 130 to share using API 106. As previously discussed, API 106 may allow mobile broadband hotspot 101 to communicate with other devices of hotspot network 109, including mobile devices 107 and 108. In the present embodiment, processor 102, executing hotspot module 105, may be configured to transmit data file 130 to mobile device 108 in response to receiving a download request from mobile device 108. This will be discussed further in the description for FIG. 3.

Figure 2:
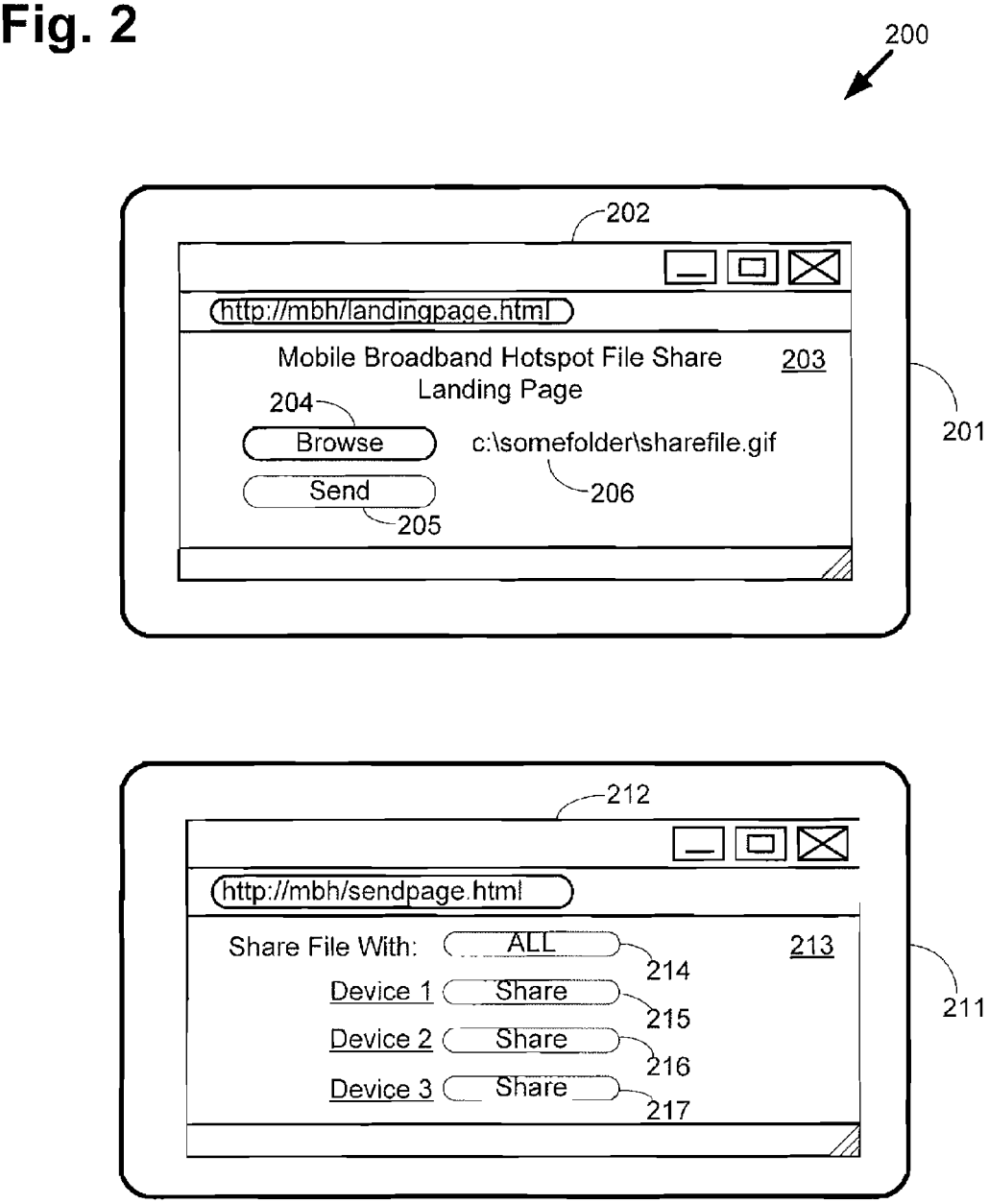
FIG. 2 presents a diagram showing screen shots of a display on a mobile device attempting to share a data file with another device, according to one embodiment of the invention.

FIG. 2 presents a diagram showing screen shots of a display on a mobile device attempting to share a data file with another device, according to one embodiment of the invention. Diagram 200 of FIG. 2 includes screen shot 201 and 211. Screen shot 201 includes web browser 202. Web browser 202 includes landing page 203. Landing page 203 includes browse button 204, send button 205, and file location text box 206. Screen shot 211 includes web browser 212. Web browser 212 includes sending page 213. Sending page 213 includes share all button 214 and share buttons 215-217.

As discussed previously, in alternative embodiments, data file 130 may be initially stored in mobile device 107 but not stored in mobile broadband hotspot 101. Screen shots 201 may be shown on a display of mobile device 107 of FIG. 1 as a user of mobile device 107 proceeds to transfer a file presently in mobile device 107 into memory 104 as data file 130 for sharing. In one embodiment, mobile broadband hotspot 101 may configure the domain name system (DNS) server address of mobile device 107 to be set to the Internet Protocol (IP) address of mobile broadband hotspot 101. Mobile broadband hotspot 101 can run a DNS redirection function to control the results of any DNS lookup performed by mobile device 107. For example, when mobile broadband hotspot 101 is in file sharing mode, mobile broadband hotspot 101 may perform DNS redirection for any DNS lookups from mobile device 107 to landing page 203. If file sharing mode is not activated, then mobile broadband hotspot 101 may allow the DNS servers within network 150 to handle all DNS requests from mobile device 107, or use a DNS server installed on mobile broadband hotspot 101 to forward all DNS requests to network 150, and then return these results to the mobile device 107 unmodified, as known in the art. Thus, mobile device 107 may be able to access landing page 203 regardless of the connectivity between mobile broadband hotspot 101 and network 150. In other embodiments, mobile device 107 may access landing page 203 through network 150. In yet other embodiments, mobile broadband hotspot may provide an applet to allow the user of mobile device 107 to upload data file 130 into memory 104 of FIG. 1. Screen shot 201 comprises web browser 202 displaying landing page 203.

A user may use browse button 204 to select a file from the memory of mobile device 107. Location text box 206 may present the directory path of the selected file on mobile device 107. Send button 205 may be used to transfer the file from mobile device 107 to memory 104 as data file 130, thereby activating the file-sharing mode of mobile broadband hotspot 101.

Screen shot 211 may be shown on a display of mobile device 107 while mobile broadband hotspot 101 is in file sharing mode. Web browser 212 may correspond to web browser 202. In the present embodiment, sending page 213 may be shown in web browser 212 after send button 205 has been used on landing page 203 to transmit a copy of data file 130a to mobile broadband hotspot 101 as data file 130b. Sending page 213 may allow the user of mobile device 107 to select devices connected to mobile broadband hotspot 101 to receive data file 130. In the present embodiment, share all button 214 may be used to share data file 130 with all devices connected to mobile broadband hotspot 101. Share buttons 215-217 may be used to send data file 130 to individual devices. In FIG. 1, share button 215 may be used to select mobile device 108 to receive data file 130 from mobile broadband hotspot 101.

Figure 3:
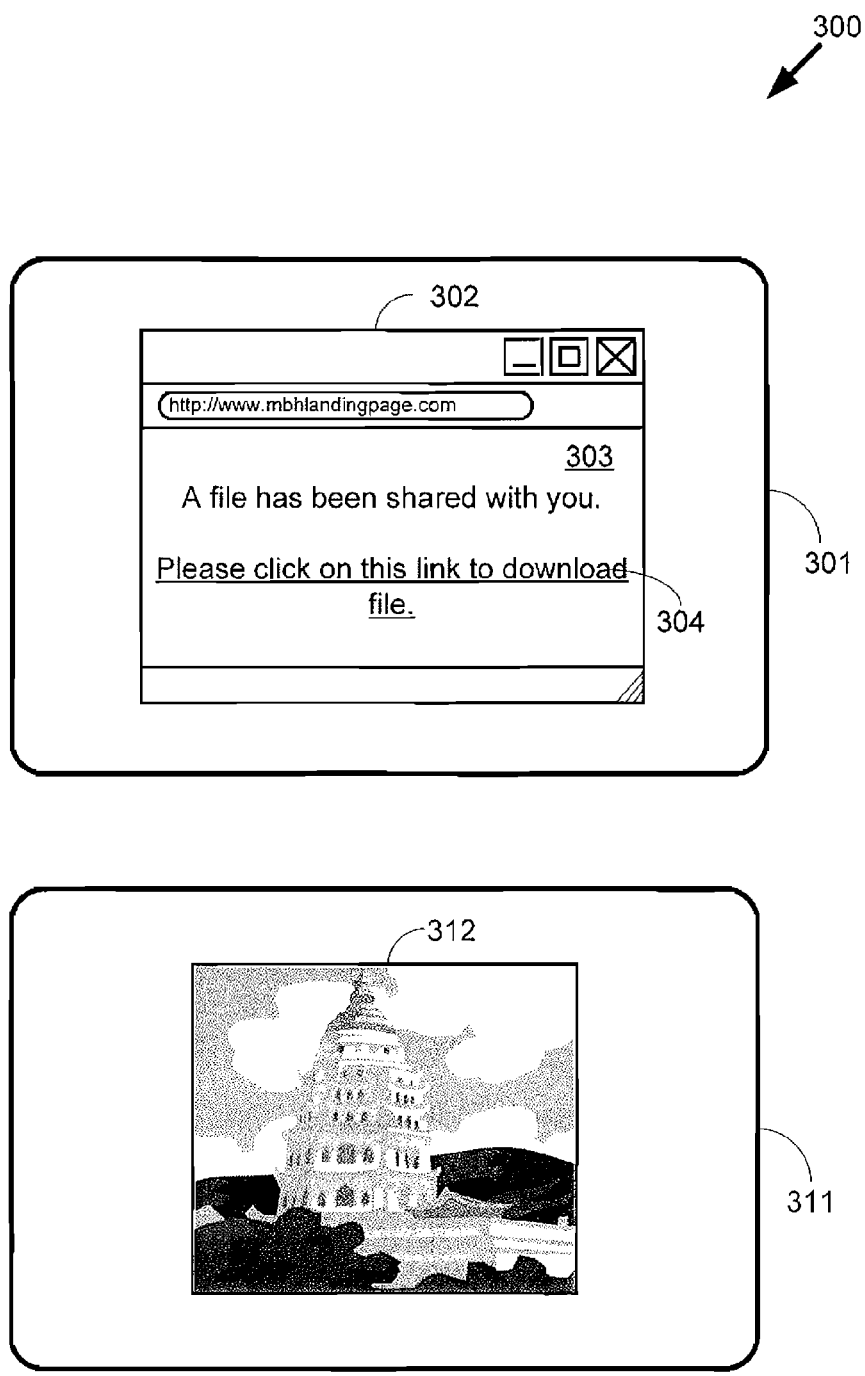
FIG. 3 presents a diagram showing screen shots of a display on a mobile device receiving a data file from the mobile broadband hotspot, according to one embodiment of the invention.

FIG. 3 presents a diagram showing screen shots of a display on a mobile device receiving a data file from the mobile broadband hotspot, according to one embodiment of the invention. Diagram 300 of FIG. 3 includes screen shots 301 and 311. Screen shot 301 includes web browser 302. Web browser 302 includes landing page 303. Landing page 303 displays download link 304. Screen shot 311 displays image file 312.

Screen shots 301 and 311 may be shown on a display of mobile device 108. As discussed earlier, once mobile device 108 of FIG. 1 has been selected to receive data file 130, processor 102 of FIG. 1, executing hotspot module 105 of FIG. 1, may be configured to notify mobile device 108 through API 106 of FIG. 1 that data file 130 may be ready for downloading and/or viewing. In one embodiment, the notifying may comprise presenting a popup notification on a display of mobile device 108. The popup notification may comprise a browser popup or an applet popup. The popup notification may also comprise a download/view link that may be used to download/view a file associated with the download link. The notifying may comprise processor 102, executing hotspot module 105, configured to redirect any hypertext transfer protocol (HTTP) requests from a browser on mobile device 108 to landing page 303. Prior to notifying mobile device 108, processor 102, executing hotspot module 105, may perform an HTTP redirection of requests from device 108 to load the host serving landing page 303, as known in the art. Similar to the description for mobile device 107, mobile broadband hotspot 101 may also set the DNS server address of mobile device 108 to the IP address of mobile broadband hotspot 101. Therefore, upon launching web browser 302 from mobile device 108, web browser 302 may be directed to display landing page 303 if mobile device 108 is in sharing mode. Landing page 303 may be stored within memory 104 of mobile broadband hotspot 101. Landing page 303 may comprise download/view link 304, which may be used by a user to download/view a copy of data file 130 residing on mobile broadband hotspot 101.

Screen shot 311 may show the result of clicking download link 304 of screen shot 301. In an embodiment, the mobile broadband hotspot 101 may detect operating parameters of the receiving device (e.g., mobile device 108) and format the data file 130 into a format compatible with the receiving device (e.g., mobile device 108). In one embodiment, by clicking download link 304, data file 130 associated with download link 304 may be presented on a display of mobile device 108. From there, the user of mobile device 108 may download data file 130, thereby acquiring a copy of data file 130 without having to download data file 130 from network 150 of FIG. 1. In other embodiments, mobile broadband hotpot 101 may be mounted as a shared hard drive on mobile device 107 and 108 and on other connected devices. Data file 130 or a copy of it may be moved from mobile device 107 into mobile broadband hotspot 101 by dropping data file 130 into the mounted drive. Upon receiving a notification of data file 130 being shared through the shared hard drive, the user of mobile device 108 may access the shared hard drive to download a copy of data file 130.

Figure 4:
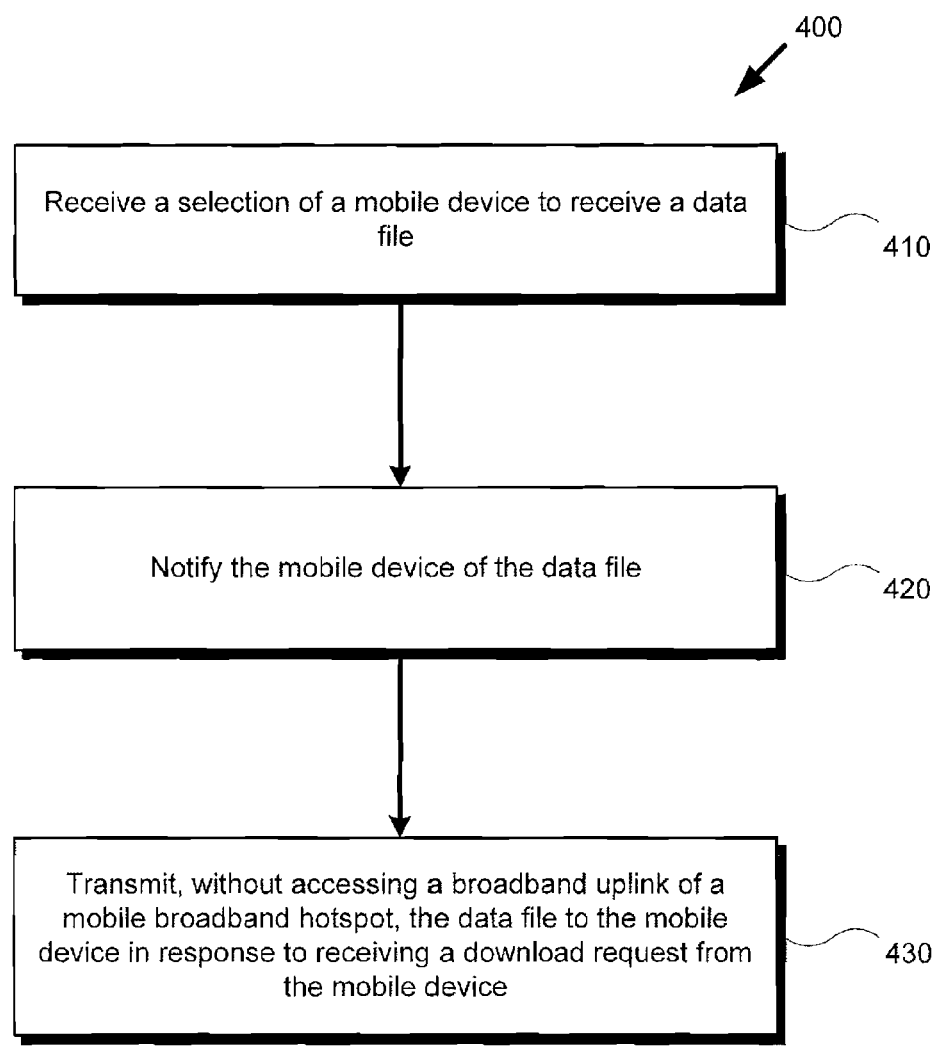
FIG. 4 shows a flowchart describing the steps by which a mobile broadband hotspot providing an application programming interface may manage data sharing over a hotspot network, according to one embodiment of the present invention.

FIG. 4 shows a flowchart describing the steps by which a mobile broadband hotspot providing an application programming interface may manage data sharing over a hotspot network, according to one embodiment of the present invention. Certain details and features have been left out of flowchart 400 that are apparent to a person of ordinary skill in the art. Thus, a step may comprise one or more sub-steps or may involve specialized equipment or materials, for example, as known in the art. While steps 410 through 430 indicated in flowchart 400 are sufficient to describe one embodiment of the present method, other embodiments may utilize steps different from those shown in flowchart 400, or may include more, or fewer steps.

Referring to step 410 of flowchart 400 in FIG. 4 and diagram 100 of FIG. 1, step 410 of flowchart 400 comprises processor 102 configured to receive a selection of mobile device 108 to receive data file 130. As previously discussed, mobile broadband hotspot 101 may receive a selection of mobile device 108 from mobile device 107.

Referring to step 420 of flowchart 400 in FIG. 4 and diagram 100 of FIG. 1 and diagram 300 of FIG. 3, step 420 of flowchart 400 comprises processor 102 configured to notify mobile device 108 of data file 130 to share. As previously discussed, mobile broadband hotspot 101 may notify the selected mobile device 108 from step 410 of the availability of data file 130 for download. As previously explained, the notifying may comprise generating a browser popup or an applet popup on the display of mobile device 108, alerting the user of mobile device 108 to download data file 130. As previously discussed, mobile broadband hotspot 101 may also temporarily redirect HTTP requests from mobile device 108 to landing page 303, thereby allowing user to download data file 130 from download link 304.

Referring to step 430 of flowchart 400 in FIG. 4 and diagram 100 of FIG. 1 and diagram 300 of FIG. 3, step 430 of flowchart 400 comprises processor 102 configured to transmit, without accessing network 150, data file 130 to mobile device 108 in response to receiving a download request from mobile device 108. Using download link 304 from step 420, a user of mobile device 108 may download a copy of data file 130. By clicking on download link 304, a download request may be transmitted mobile broadband hotspot 101. In response to the download request, mobile broadband hotspot 101 may transmit a copy of data file 130 to mobile device 108 in order for data file 130 to be presented and downloaded. Thus, the broadband uplink of mobile broadband hotspot 101 may not be accessed during step 430, thereby advantageously conserving bandwidth to stay within a transfer quota of the data plan subscriber.

Thus, a system and method for providing for managing data sharing over a hotspot network has been disclosed. In an effort to prevent downloading the same data files multiple times through a mobile broadband hotspot, the mobile broadband hotspot may be configured to store a data file downloaded from Internet or received from a mobile device connected to the mobile broadband hotspot. Mobile broadband hotspot may then notify a selected number of devices over a hotspot network to receive the data file from the mobile broadband hotspot. Another client device may direct the mobile broadband hotspot to select other devices to receive the data file. Accordingly, a data file initially existing only on mobile device or within mobile broadband hotspot may be shared with other mobile devices through a hotspot network without requiring the other mobile devices to download the data file again.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A mobile broadband hotspot for managing a data sharing over a hotspot network, the mobile broadband hotspot comprising:
    a memory; and
    a processor configured to:
        receive a first request from a first mobile device via the hotspot network to receive a data file;
        download the data file via a wide area network in communication with the mobile broadband hotspot;
        store the data file in the memory of the mobile broadband hotspot;
        transmit, via the hotspot network, the data file to the first mobile device in response to receiving the first request from the first mobile device;
        receive a second request from a second mobile device via the hotspot network to receive the data file;
        determine that the data file is in the memory and that the mobile broadband hotspot is authorized to share the data file with the second mobile device;
        in response to determining that the data file in the memory is authorized to be shared with the second mobile device, retrieve the data file from the memory, without downloading the data file via the wide area network;
        transmit, via the hotspot network, the data file retrieved from the memory to the second mobile device in response to receiving the second request from the second mobile device.

2. The mobile broadband hotspot of claim 1, wherein the processor, prior to receiving the first request, is configured to activate a file sharing mode of the mobile broadband hotspot.

3. The mobile broadband hotspot of claim 1 further comprising uploading the data file into a landing page of the mobile broadband hotspot.

4. The mobile broadband hotspot of claim 1 further comprising presenting a popup notification on a display of the first mobile device after downloading the data file.

5. The mobile broadband hotspot of claim 4, wherein the popup notification comprises a browser popup.

6. The mobile broadband hotspot of claim 4, wherein the popup notification comprises a download link.

7. The mobile broadband hotspot of claim 1 further comprising redirecting a hypertext transfer protocol (HTTP) request from a browser on the first mobile device to a landing page.

8. The mobile broadband hotspot of claim 7, wherein the processor, prior to redirecting, is configured to use a dynamic host configuration protocol (DHCP) server of the mobile broadband hotspot to set a domain name system (DNS) server address for the first mobile device.

9. The mobile broadband hotspot of claim 7, wherein the landing page comprises a download link.

10. A method for use by a mobile broadband hotspot for managing a data sharing over a hotspot network, the method comprising:
    receiving a first request from a first mobile device via the hotspot network to receive a data file;
    downloading the data file via a wide area network in communication with the mobile broadband hotspot;
    storing the data file in the memory of the mobile broadband hotspot;
    transmitting, via the hotspot network, the data file to the first mobile device in response to receiving the first request from the first mobile device;
    receiving a second request from a second mobile device via the hotspot network to receive the data file;
    determining that the data file is in the memory and that the mobile broadband hotspot is authorized to share the data file with the second mobile device;
    in response to determining that the data file in the memory is authorized to be shared with the second mobile device, retrieving the data file from the memory, without downloading the data file via the wide area network;
    transmitting, via the hotspot network, the data file retrieved from the memory to the second mobile device in response to receiving the second request from the second mobile device.

11. The method of claim 10, wherein, prior to receiving the first request, the method comprises activating a file sharing mode of the mobile broadband hotspot.

12. The method of claim 10 further comprising uploading the data file into a landing page of the first mobile broadband hotspot.

13. The method of claim 10 further comprising presenting a popup notification on a display of the first mobile device.

14. The method of claim 13, wherein the popup notification comprises a browser popup.

15. The method of claim 13, wherein the popup notification comprises a download link.

16. The method of claim 10 further comprising redirecting a hypertext transfer protocol (HTTP) request from a browser on the device to a landing page.

17. The method of claim 16, wherein, prior to redirecting, the method comprises using a dynamic host configuration protocol (DHCP) server of the mobile broadband hotspot to set a domain name system (DNS) server address for the device.

18. The method of claim 16, wherein the landing page comprises a download link.

19. The mobile broadband hotspot of claim 1, wherein the processor is further configured to detect at least one mobile device parameter of the second mobile device, and wherein transmitting the data file, formatted according to the at least one mobile device parameter, to the second mobile device.

20. The method of claim 10 further comprising detecting at least one mobile device parameter of the second mobile device, wherein transmitting the data file, formatted according to the at least one mobile device parameter, to the second mobile device.

\* \* \* \* \*